United States Patent
Thapar et al.

(10) Patent No.: US 9,300,814 B2
(45) Date of Patent: Mar. 29, 2016

(54) NETWORK ADAPTIVE CONTENT DOWNLOAD

(75) Inventors: Gautam Thapar, Redmond, WA (US); Jimin Li, Bellevue, WA (US)

(73) Assignee: Microsoft Technology Licensing LLC, Redmond, WA (US)

(*) Notice: Subject to any disclaimer, the term of this patent is extended or adjusted under 35 U.S.C. 154(b) by 468 days.

(21) Appl. No.: 13/230,659

(22) Filed: Sep. 12, 2011

(65) Prior Publication Data
US 2013/0067064 A1 Mar. 14, 2013

(51) Int. Cl.
| | | |
|---|---|---|
| G06F 15/173 | (2006.01) | |
| H04M 15/00 | (2006.01) | |
| H04L 12/24 | (2006.01) | |
| H04L 12/14 | (2006.01) | |
| G06Q 30/04 | (2012.01) | |
| G06Q 30/06 | (2012.01) | |

(52) U.S. Cl.
CPC ........... *H04M 15/8083* (2013.01); *G06Q 30/04* (2013.01); *G06Q 30/06* (2013.01); *H04L 12/145* (2013.01); *H04L 12/1417* (2013.01); *H04L 12/1496* (2013.01); *H04L 41/0826* (2013.01); *H04L 41/5029* (2013.01); *H04L 12/1421* (2013.01)

(58) Field of Classification Search
CPC .................. H04L 12/1417; H04L 41/0826
USPC .......................................................... 709/224
See application file for complete search history.

(56) References Cited

U.S. PATENT DOCUMENTS

| | | | | |
|---|---|---|---|---|
| 6,463,468 | B1* | 10/2002 | Buch et al. .................... | 709/219 |
| 6,973,309 | B1* | 12/2005 | Rygula et al. ................. | 455/436 |
| 7,421,413 | B2* | 9/2008 | Frank et al. ................... | 705/418 |
| 7,787,818 | B2 | 8/2010 | Shapiro et al. | |
| 7,937,451 | B2 | 5/2011 | Ho et al. | |
| 8,019,886 | B2* | 9/2011 | Harrang et al. ............... | 709/232 |
| 8,027,671 | B2* | 9/2011 | Wallace et al. ............... | 455/420 |
| 8,095,642 | B1* | 1/2012 | Martin et al. ................. | 709/224 |
| 8,150,933 | B2* | 4/2012 | Martin et al. ................. | 709/207 |
| 8,189,548 | B2* | 5/2012 | Caldwell et al. .............. | 370/338 |
| 8,626,113 | B2* | 1/2014 | Banjo ........................... | 455/405 |
| 2002/0013854 | A1* | 1/2002 | Eggleston et al. ............ | 709/234 |

(Continued)

OTHER PUBLICATIONS

Vartiainen, et al., "Auto-update: a Concept for Automatic Downloading of Web Content to a Mobile Device", in Proceedings of the 4th International Conference on Mobile Technology, Applications, and Systems and the 1st International Symposium on Computer Human Interaction in Mobile Technology, Sep. 10-12, 2007, pp. 683-689.

*Primary Examiner* — Blake Rubin
(74) *Attorney, Agent, or Firm* — Aneesh Mehta; Kate Drakos; Mickey Minhas

(57) ABSTRACT

Techniques for managing content downloads to a computing device. The techniques include an agent on the computing device determining for each network of a plurality of networks available to the computing device, costs of downloading content and an exemption list. The exemption list includes content downloads that are exempted from costs charged by a particular network. The agent determines possible content downloads for the computing device. The agent also assesses potential costs associated with the possible content downloads based upon the costs and exemption lists determined for the plurality of networks. Based upon the assessment, the agent selects one of the networks for downloading at least part of the possible content downloads.

22 Claims, 2 Drawing Sheets

(56) References Cited

U.S. PATENT DOCUMENTS

| | | |
|---|---|---|
| 2003/0091031 A1* | 5/2003 | Kuhlmann et al. ............ 370/352 |
| 2004/0267812 A1* | 12/2004 | Harris et al. ................ 707/104.1 |
| 2006/0056336 A1* | 3/2006 | Dacosta ........................ 370/328 |
| 2006/0218604 A1 | 9/2006 | Riedl et al. |
| 2007/0021110 A1 | 1/2007 | Chaudhri et al. |
| 2007/0067297 A1* | 3/2007 | Kublickis ........................... 707/9 |
| 2007/0201502 A1* | 8/2007 | Abramson .................... 370/429 |
| 2007/0211674 A1 | 9/2007 | Ragnar Karlberg et al. |
| 2008/0085717 A1* | 4/2008 | Chhabra et al. ............... 455/450 |
| 2008/0195664 A1 | 8/2008 | Maharajh et al. |
| 2009/0063419 A1* | 3/2009 | Nurminen et al. ................. 707/3 |
| 2009/0172079 A1* | 7/2009 | Eggleston et al. ............ 709/202 |
| 2009/0198580 A1* | 8/2009 | Broberg et al. .................. 705/14 |
| 2010/0144310 A1* | 6/2010 | Bedingfield et al. .......... 455/405 |
| 2010/0190470 A1* | 7/2010 | Raleigh ......................... 455/406 |
| 2011/0176482 A1 | 7/2011 | Vizor et al. |
| 2011/0231517 A1* | 9/2011 | Srinivasan et al. ............ 709/219 |
| 2011/0275344 A1* | 11/2011 | Momtahan et al. ........... 455/405 |
| 2011/0276442 A1* | 11/2011 | Momtahan et al. ............. 705/30 |
| 2012/0036051 A1* | 2/2012 | Sachson ......................... 705/30 |
| 2012/0084392 A1* | 4/2012 | Lipfert et al. ................. 709/217 |
| 2012/0089845 A1* | 4/2012 | Raleigh ......................... 713/176 |
| 2012/0192249 A1* | 7/2012 | Raleigh ............................. 726/2 |

* cited by examiner

NETWORK ADAPTIVE CONTENT DOWNLOAD

BACKGROUND

Increasing adoption of metered networks for connecting to and providing downloadable content to various computing devices such as, for example, laptop computers, notebook computers, professional digital assistants (PDAs), mobile phones, etc. can provide benefits if the computing devices are network cost sensitive. With metered networks, users can generally experience "bill shock" caused by network utilization that they are unaware of. It is increasingly being mandated by regulatory bodies that network operators do as much as possible to prevent users from the need to pay for more data usage than they signed up for.

With new form factors and computing devices being produced at a rapid rate, application developers are building more and more applications with connected experiences for the end user. The result is that users have no idea when enjoying these experiences as to the extent of bandwidth being utilized for content downloads and are thus susceptible to bill shock. This is becoming one of the top customer satisfaction issues with respect to network operators.

While interactive or user initiated network usage can still be justified to the user, anything transferred over the network in the background has to make sense for the user when downloading over metered networks. Making decisions whether to download content based on network costs associated therewith can also have repercussions for critical content such as, for example, security fixes, important documents or time sensitive material. A common approach undertaken by some operating systems/applications is to prevent downloading in the background over metered networks.

However, in some instances, it is in the interest of both the user and the network operator that certain critical content be delivered to the user in a timely fashion regardless of the potential cost associated with the download.

SUMMARY

This summary introduces concepts for a system or application for network adaptive content download. The concepts are further described below in the detailed description. This summary is not intended to identify essential features of the claimed subject matter, nor is it intended for use in limiting the scope of the claimed subject matter.

This disclosure describes example embodiments for managing content downloads to a computing device. In one embodiment, an agent on the computing device determines for each network of a plurality of networks available to the computing device, costs of downloading content and an exemption list. The exemption list includes content downloads that are exempted from costs charged by a particular network. The agent determines possible content downloads for the computing device. The agent also assesses potential costs associated with the possible content downloads based upon the costs and exemption lists determined for the plurality of networks. Based upon the assessment, the agent selects one of the networks for downloading at least part of the possible content downloads.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
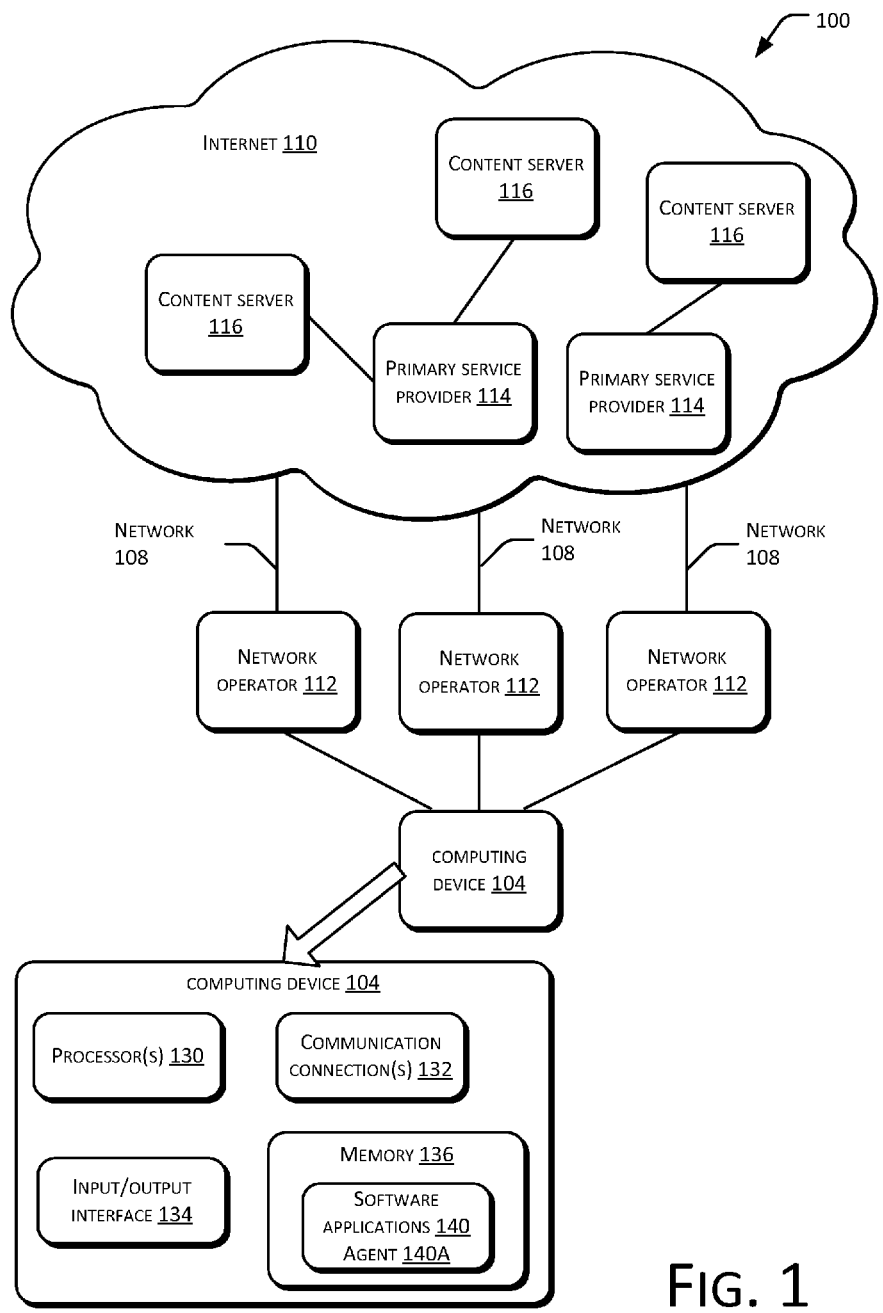
FIG. 1 illustrates an example system usable to implement methods for managing content downloads to a computing device within the system.

As previously noted, existing technologies can make it difficult to accurately and adaptively allow for content downloads to a computing device over various networks without the user receiving a bill that is larger than the user expected.

The present disclosure provides a method of managing content downloads to a computing device that allows for selecting a network over which to download content that helps minimize costs to the user.

Generally, a user of a computing device such as, for example, a laptop computer, a notebook computer, a mobile phone, a personal digital assistant (PDA), etc. uses such a computing device in various locations. Often, many of the applications executed on the computing device result in content downloads that occur in the background, i.e., unbeknownst to the user, in order to contribute to an interactive activity and to automatically provide system updates. Additionally, many applications that operate on the computing devices often need various content downloads in order to update applications that operate on the computing device. Some of the updates can include security related content. Additionally, there can be various content downloads that the user desires to have downloaded for various reasons. General use of the term application herein refers to, for example, a software application, an executable file, an application program, an application platform, an operation, etc.

Generally, the user of the computing device signs up for Internet access through a network provider/network operator. The network operator/network provider generally provides Internet access in a certain geographic location. The geographic location can range from worldwide to national to small regional and/or local regions.

Often, as a computing device is moving around to different locations, the various networks has available to it and to which the computing device can be connected may have various costs associated with using a particular network, particularly, with respect to content downloads. In accordance with various embodiments of the present disclosure, the computing device includes a component/application (hereinafter referred to as an "agent") that checks against an online data source for content to be downloaded to the computing device. The online data source can be provided by the network operator/network provider.

The content for possible downloads can include system updates, content for interactive experiences, and content needed for applications currently operating on the computing device. The agent determines the content available to be downloaded to the computing device and thus, the agent needs to determine various aspects (cost, capacity, throughput, utilization) of a network that it will use to access the primary service provider and download the content. Since the computing device can be connected to multiple networks at any given moment, costs associated with the multiple networks need to be assessed. For example, the computing device may be connected to the Internet via an Ethernet network, a WIFI network or a mobile broadband network.

Each of these various networks has a cost associated with their use, depending on how much the user has to pay for it, that needs to be taken into account in determining a network to use for downloading downloadable content. The costs can also vary based upon various factors such as, for example, geographical location (i.e., a primary network operator/network provider ("home network") versus a different network operator/network provider ("roaming network") for accessing the Internet). The costs can also vary based upon a quota of data for use in downloading content for which the user has signed up for with the network operator/network provider (i.e., unlimited, one GB/month, etc.).

The agent then decides which network should be used based upon the one with the lowest cost and can attempt to download over it. Once again, determining the lowest cost can include the size of the content download, the throughput, capacity, etc. and the costs associated with the various networks. The agent can also pick a default network and attempt to download over it.

Depending upon the cost of the network that is selected by the agent, the agent decides how to proceed with the downloading of each piece of content download. The agent may decide to automatically download everything, especially if the computing device is on an unrestricted network (i.e., a home network, unlimited data signed up for, a particular network, etc.). The agent may also decide to automatically download everything as long as the cost is below a predetermined threshold of the user's bandwidth quota. The agent may decide to automatically download only certain types of content on a particular network and delay other types of content download. Such a delay may allow for the computing device to, for example, move to where another less expensive network is available for downloading. The agent may also delay all downloads and ask the user to approve downloading over a given network. In addition, the agent may decide to delay all downloads and wait for a lower cost network to become available.

In accordance with various embodiments of the present disclosure, the network operator supplies to the agent a configuration file that determines download behavior on the given network. The configuration file includes a list of classifications/categories of downloadable content that are exempted from network charges for network dependent downloading for each independent content source that from which the agent downloads. Examples of such classifications and categories include downloading from an application store service that exempts top rated or top selling applications such as, for example, games, movies, music, etc. The exemption list can also include all security related content when downloading system updates. Another possible exemption includes all updates for previously acquired applications. The exempted content downloads on the exemption list can also be determined based upon various factors. For example, the time of day, expected times of low network congestion, etc. can be used to add and remove content downloads on the exemption list. Thus, the exemption list can be a dynamic list.

The exemption list can also be provided via message fragments exchanged during communication to and from the network operator. Alternatively, the exemption list can also be provided by the primary service provider. In such a case, the network operator/network provider may just limit the exemption list's configuration to allow or disallow the directive from a primary service provider's content download source.

The agent automatically tags all exempted downloads distinctly to differentiate them from other content downloads so that the network operators can exercise appropriate auditing and billing to the user. Each network operator can specify how their exempted downloads are to be tagged. The tagging methodology can be specified as part of the configuration file supplied by the network operator or via message fragments exchanged during communication to and from the primary service (e.g., simple object access protocol (SOAP) message fragments and specified using name value pairs).

Enabling exempted content to be downloaded without network constraints means that the network operators may see higher bandwidth consumption. Though this serves the purpose of faster delivery of exempt content as desired by the network operator or the content download source provider, it may add more cost/resources to handle peak load operation of the network. To alleviate this, a mechanism is provided where the network operator can dynamically specify to the agent that it is experiencing peak network load and downloads need to be paused as long as the network operator deems appropriate. This allows the network operator to exercise better control over egress and bandwidth during peak times.

Example Architecture

FIG. 1 illustrates an example of a system 100. The system 100 includes a computing device 104 that can be in the form of a mobile computing device. The computing device 104 is connected to a plurality of networks 108 that provide access to the Internet 110. As the computing device 104 moves, it will lose and/or gain communication with networks 108 that are illustrated in FIG. 1 and networks that are not illustrated in FIG. 1. Thus, the number of networks 108 illustrated in FIG. 1 is merely an example.

Each of the networks 108 includes a network operator 112 that provides access to the Internet 110. Additionally, the networks 108 are generally connected to one or more primary service providers 114 that provide access to various content servers 116 that include downloadable content. A network operator 112 may also act as a primary service provider 114. For example, a network operator 112 can provide an on demand video viewing service for its network subscribers. The content servers 116 can be located within the networks 108 and can be controlled by a network operator 112. Additionally, the content servers 116 and primary service providers 114 can be located at various web addresses on the Internet 110 that are accessible by the computing device 104 via the Internet 110 and can provide downloading of various downloadable content. One or more of the content servers 116 are also located at the primary service provider 114.

In the example system 100 of FIG. 1, the computing device 104 is generally in the form of, for example, a laptop computer, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof. Such computing devices generally combine some or all of the elements of a stationary computing system into a single device. For example, a laptop computer includes a visual display, a keyboard, and often a touchpad that functions as a mouse. The computing device 104 can be in the form of a stationary computing system if desired. Such a stationary computing system is often referred to as a desktop arrangement, which includes a computer that sits on a desktop or can be configured to sit on the floor, and further includes, for example, a separate visual display, a separate keyboard, and often a pointing device such as a mouse.

The computing device 104 includes one or more processors 130 connected to a memory 136. The computing device 104 may further include one or more communication connection(s) 132 and one or more input/output interfaces 134. The communication connection(s) 132 allow the computing device 104 to communicate with other computing devices over wired and/or wireless networks and may include, for example, wide area, local area, and/or personal area network connections. For example, the communication connection(s) 132 may include cellular network connection components, WiFi network connection components, Ethernet network connection components, or the like. The input/output interfaces 134 can include a display, a keyboard, a mouse, a touch pad, a roller ball, a scroll wheel, an image capture device, an audio input device, an audio output device, and/or any other input or output devices.

The memory 136 is an example of computer-readable media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 136 includes one or more software applications 140. As an example, the software applications 140 generally include an operating system (e.g., Windows® operating system, Mac® operating system, or the like), one or more platform software (e.g., Java®), and/or various application programs (e.g., a web browser, an email client, a word processing application, a spreadsheet application, a voice recording application, a calendaring application, a news application, a text messaging client, a media player application, a photo album application, an address book application, a weather application, a viewfinder application, a social networking application, a game, and/or the like). In accordance with various embodiments, the memory includes a software application, referred to herein as an agent 140A, that serves to manage content download over the various networks to the computing device 104. The agent 140A can be a separate application or can be included within the operating system for the computing device 104.

Example Methods

A computing device 104 can move around to different locations. The computing device 104 can access the Internet 110 through the various types of networks 108 and the corresponding network operators 112 to which it is connected. Sometimes, the computing device 104 is only connected to one type of network 108. Other times, the computing device 104 is connected to multiple types of networks 108.

The agent 140A determines the networks 108 that the computing device 104 has available to it. Examples of networks include, for example, Ethernet, Wi-Fi or mobile broadband type networks. Each network 108 is provided by a corresponding network operator 112. The computing device 104 can be connected to none, on or more of the networks 108 that are available.

When the computing device 104 connects with a particular network 108, the network operator 112 for a particular network 108 provides costs associated with accessing, using and downloading content with respect to its particular network 108 to the agent 140A. The content servers 116 provide content/configuration files to the network operator 112 for a particular network 108 to thereby provide the agent 140A with an exemption list that exempts various content downloads from having a download cost associated therewith. Examples of exempted content include downloading from an application store service (at a primary service provider 114 and/or a content server 116 for example) that exempts top rated or top selling applications such as, for example, games, movies, music, etc.

The exemption content can also include all security related content when downloading system updates. Another possible exemption includes all updates for previously acquired applications.

In addition, the exempted content downloads on the exemption list can also be determined based upon various factors. For example, the time of day, expected times of low network congestion, etc. can be used to add and remove content downloads on the exemption list. Thus, the exemption list can be a dynamic list.

The exemption list can also be provided via message fragments exchanged during communication to and from the network operator 112. Alternatively, the exemption list can also be provided by the primary service provider 114. In such a case, the network operator 112 may just limit the exemption list's configuration to allow or disallow the directive from the content download source, i.e., the content server 116.

The agent 140A automatically tags all exempted downloads distinctly to differentiate them from other content downloads so that the network operators can exercise appropriate auditing and billing to the user. Each network operator can specify how their exempted downloads are to be tagged. The tagging methodology can be specified as part of the configuration file supplied by the network operator or via message fragments exchanged during communication to and from the primary service (e.g., simple object access protocol (SOAP) message fragments and specified using name value pairs).

The agent 140A determines possible content download for the computing device 104 to download. The agent 140A searches the primary service provider 114 for various updates for applications located on the computing device 104. The primary service provider 114 can include information relating to the various updates or may obtain the information from the content servers 116. The content download can include system updates, which can include security updates, music, movies, games, etc. Often, the needed content download can be interactive. For example, the user of the computing device 104 may be playing a game that requires interactive content from one of the content servers 116. Additionally, the user may be listening to music or watching a movie in a fashion where the content is being streamed over the Internet 110 from one of the content servers 116, i.e., being delivered in real time, to the computing device 104.

The agent 140A compiles various download files that include data relating to possible content downloads for the computing device 104 and stores the download files in memory 136. The download files have costs associated therewith relating to costs for performing the content download. If the computing device 104 is connected to more than one network 108, then the download files will have costs associated therewith that are specific to particular networks 108. Factors affecting cost can include the size of the content download, and the throughput, capacity, etc. associated with the various networks 108. Additionally, costs can be affected by whether or not the computing device 104 is accessing the Internet 110 via a home network 108 and network operator 112, or if the computing device 104 is accessing the Internet 110 via another network 108 and network operator 112 that is not its home network, i.e., the computing device 104 is roaming. Download files related to exempted content are tagged as exempt. Each network operator 112 can specify how their exempted content downloads are to be tagged. In one embodiment, content downloads are tagged to be hosted from a specific content server 116 offered by the primary service provider 114.

Based upon the download files and associated costs with the various networks 108, the agent 140A determines whether or not any content should be downloaded. The agent 140A selects a network 108 to be used (if the computing device 104 has available to it and/or is connected to more than one network 108).

In accordance with various embodiments, a default network or a preferred network may be defined by the agent 140A based upon known costs, or a lack of costs, associated with a particular network 108. Thus, the agent 140A may automatically select the default network if available, and if the computing device 104 is connected to the default network.

All content download files that are exempted by a current or selected network operator 112 are downloaded. However, if the computing device 104 is roaming, then even exempted download files may not have the content associated therewith downloaded due to increased cost. In such instances, the agent 140A may ask the user whether to proceed with the download.

However, enabling exempted content to be downloaded without network constraints means that the selected network 108 may see higher bandwidth consumption. Though this serves the purpose of faster delivery of exempt content as desired by a network operator 112 or a primary service provider 114 (e.g. security updates need to be pushed to the computing device 104 quickly), it may add more cost/resources to handle peak load operation of the selected network 108. To alleviate this, in accordance with various embodiments, the network operator 112 dynamically specifies to the agent 140A that it is experiencing peak network load and downloads to the computing device 104 need to be paused by the agent 140A as long as the network operator 112 deems appropriate. This allows the network operator 112 to exercise better control over egress and bandwidth during peak times.

If the computing device 104 is connected to a network 108 that has unrestricted downloading, i.e., downloading without incremental cost (often referred to as a home network), then such a network 108 is selected by the agent 140A and all content download proceeds through such network. Generally, such a network is often deemed a default or preferred network by the agent 140A. Furthermore, some content may be designated necessary by the operating system and/or agent 140A and therefore, should be downloaded regardless of the cost, even if the computing device 104 is roaming.

More particularly, depending upon the cost of the network 108 that is selected by the agent 140A, the agent 140A decides how to proceed with each download file and the downloading of each piece of content download associated with each download file. The agent 140A may decide to automatically download everything, i.e., all download files, especially if the selected network 108 is an unrestricted network (i.e., a home network, unlimited data signed up for, a particular network, etc.). The agent 140A may also decide to automatically download everything associated with all download files as long as the cost is below a pre-determined threshold of the user's bandwidth quota purchased for a selected network 108.

The agent 140A may decide to automatically download only certain types of content on the selected network 108 and delay other types of content download. For example, only download files relating to content that are designated necessary by the operating system and/or agent 140A should be downloaded regardless of the cost, may be downloaded on the selected network 108. Such a delay may allow for the computing device 104 to, for example, move to where another less expensive network 108 is available for downloading content relating to other download files.

The agent 140A may wait for a different time period to download some or all of the download files. For example, if a user is close to exceeding a purchased amount of data downloading for the current billing cycle, then the agent may wait until the next billing cycle to download some or all of the download files.

The agent 140A may also decide to delay all downloading for all download files and ask the user to approve downloading over the selected network 108. In addition, the agent 140A may decide to delay all downloading for all downloads automatically and wait for a lower cost network to become available.

If the computing device 104 moves during downloading such that the available networks 108 to which the computing device 104 is connected change, then the agent 140A will assess the costs associated with the various networks 108 and additionally the costs associated with the various content still to be downloaded. The agent 140A may determine that content downloading should cease until a less expensive or no cost network 108 is once again connected to the computing device 104. Alternatively, the agent 140A can suspend some or all of the content downloading and check with the user to see which content the user wishes to continue downloading.

Figure 2:
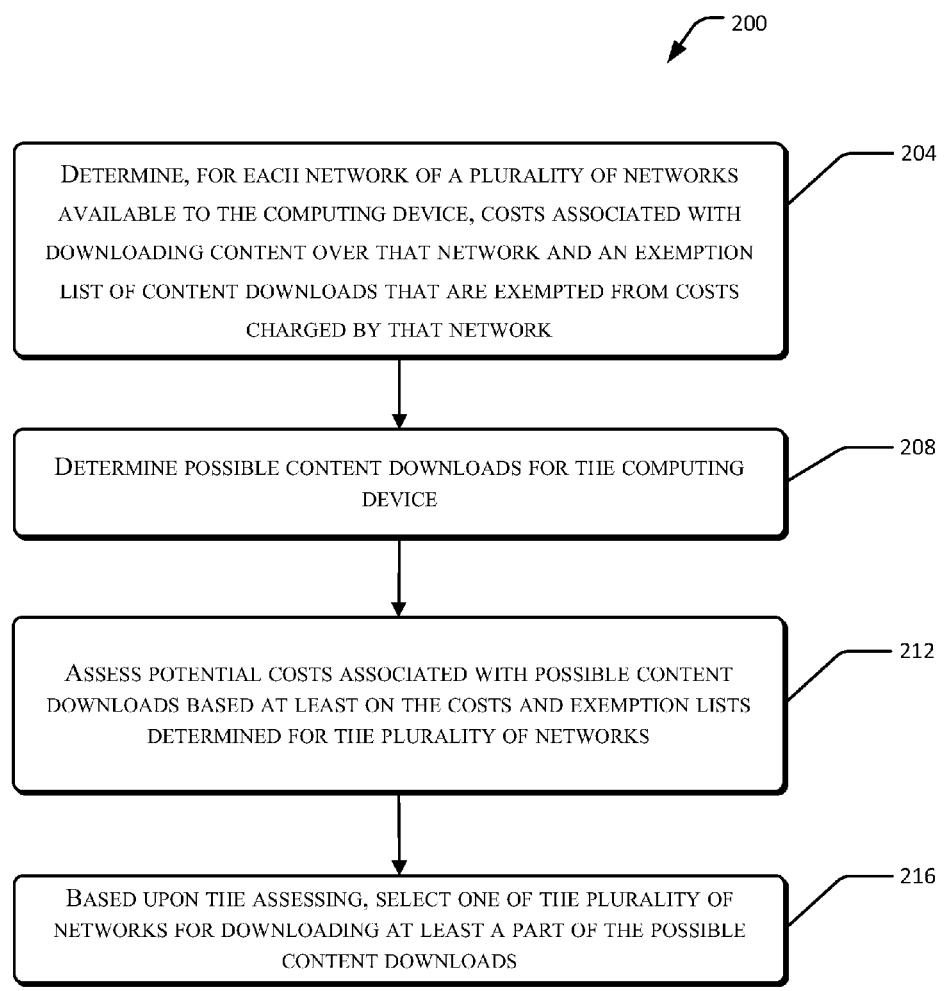
FIG. 2 illustrates an example method of managing content downloads to a computing device within the system of FIG. 1.

Thus, with reference to FIG. 2, a method 200 for managing content downloads to a computing device includes, at 204, determine, for each network of a plurality of networks available to the computing device, costs associated with downloading content over that network and an exemption list of content downloads that are exempted from costs charged by that network. At 208, the method 200 includes determine possible content downloads for the computing device. At 212, the method 200 includes assess potential costs associated with possible content downloads based at least on the costs and exemption lists determined for the plurality of networks. At 216, the method 200 further includes based upon the assessing, select one of the plurality of networks for downloading at least a part of the possible content downloads. This method, as well as any other methods described herein, may be illustrated as a collection of acts in a logical flow graph. The logical flow graph represents a sequence of operations that can be implemented in hardware, software, or a combination thereof. In the context of software, the blocks represent computer instructions stored on one or more computer-readable media that, when executed by one or more processors, perform the recited operations. Note that the order in which the process is described is not intended to be construed as a limitation, and any number of the described acts can be combined in any order to implement the process, or an alternate process. Additionally, individual blocks may be deleted from the process without departing from the spirit and scope of the subject matter described herein.

CONCLUSION

Although the invention has been described in language specific to structural features and/or methodological acts, it is to be understood that the invention is not necessarily limited to the specific features or acts described. Rather, the specific features and acts are disclosed as example forms of implementing the invention.

What is claimed is:

1. A computer-implemented method comprising:
   determining possible content downloads initiated by a computing device for background downloading;
   by the computing device, assessing potential costs associated with the possible content downloads based at least on first costs and a first exemption list for a first network and second costs and a second exemption list for a second network, the first exemption list and the second exemption list indicating content downloads that are exempted from costs charged by the first network and the second network, respectively;
   based upon the assessing, selecting by the computing device one of the first network or the second network for background downloading to the computing device at least a part of the possible content downloads;
   executing a background downloading based upon the selection;
   determining, during the background downloading, that the selected network becomes unavailable for performing the background downloading;
   in response to the determining that the selected network becomes unavailable, assessing by the computing device costs associated with one or more available networks and costs associated with content still to be downloaded; and
   ceasing content downloading based on the costs associated with the one or more available networks exceeding a threshold.

2. The computer-implemented method of claim 1, wherein the at least a part of the possible content downloads includes any of the possible content downloads that appear on the exemption list for the selected network.

3. The computer-implemented method of claim 1, wherein the assessing is further based on network capacity of the first network and the second network, throughput of the first network and the second network, utilization of the first network and the second network, sizes of the possible content downloads, a geographical location of the computing device and quotas of data allowed by the first network and the second network for the computing device.

4. The computer-implemented method of claim 1, further comprising tagging possible content downloads that appear on the first exemption list or the second exemption list, wherein the tagging is performed based upon a configuration file received from a network operator.

5. The computer-implemented method of claim 1, further comprising:
   receiving from a network operator for the selected network information that the selected network is experiencing peak load; and
   pausing downloading the one or more content downloads over the selected network until the network operator provides information that the selected network is no longer experiencing peak load.

6. The computer-implemented method of claim 1, wherein one of the first network or the second network has a default network status or a preferred network status and the assessing is further based on which of the networks has the default network status or the preferred network status.

7. The computer-implemented method of claim 1, further comprising downloading all of the possible content downloads if a cost of doing so is at or below a certain threshold of a user's bandwidth quota for the selected network.

8. The computer-implemented method of claim 1, further comprising downloading the part of the possible content downloads, the part of the possible content downloads being associated with a specific download type.

9. The computer-implemented method of claim 1, further comprising delaying downloading of the possible content downloads and requesting approval for downloading any of the possible content downloads.

10. The computer-implemented method of claim 1, wherein categories of content downloads that are included in the first exemption list and the second exemption list comprise content downloads related to security updates, top rated content downloads at application stores, top selling content downloads at application stores and previously acquired content downloads.

11. One or more computer storage media configured with computer-executable instructions that, when executed by one or more processors within a computing device, configure the one or more processors to perform acts comprising:
    determining possible content downloads initiated by a computing device for background downloading;
    assessing potential costs associated with the possible content downloads based at least on first costs and a first exemption list for a first network and second costs and a second exemption list for a second network, the first exemption list and the second exemption list indicating content downloads that are exempted from costs charged by the first network and the second network, respectively;
    based upon the assessing, selecting one of the first network or the second network for background downloading at least a part of the possible content downloads;
    executing a background downloading based upon the selection;
    determining, during the background downloading, that the selected network becomes unavailable for performing the background downloading;
    in response to the determining that the selected network becomes unavailable, assessing by the computing device costs associated with one or more available networks and costs associated with content still to be downloaded; and
    ceasing content downloading based on the costs associated with the one or more available networks exceeding a threshold.

12. The one or more computer storage media of claim 11, wherein the at least a part of the possible content downloads includes any of the possible content downloads that appear on the exemption list for the selected one of the first network or second network.

13. The one or more computer storage media of claim 11, wherein the acts further comprise tagging possible content downloads that appear on the first exemption list or the second exemption list, wherein the tagging is performed based upon a configuration file received from a network operator.

14. The one or more computer storage media of claim 11, wherein the assessing is further based on network capacity of the first network and the second network, throughput of the first network and the second network, utilization of the first network and the second network, sizes of the possible content downloads, a geographical location of the computing device and quotas of data allowed by the first network and the second network for the computing device.

15. The one or more computer storage media of claim 11, wherein the acts further comprise:
   receiving from a network operator for the selected network information that the selected network is experiencing peak load; and
   pausing downloading the one or more content downloads over the selected network until the network operator provides information that the selected network is no longer experiencing peak load.

16. The one or more computer storage media of claim 11, wherein one of the first network or the second network has a default network status or a preferred network status and the assessing is further based on which of the networks has the default network status or the preferred network status.

17. The one or more computer storage media of claim 11, wherein the acts further comprise downloading all of the possible content downloads if a cost of doing so is at or below a certain threshold of a user's bandwidth quota for the selected network.

18. The one or more computer storage media of claim 11, wherein the acts further comprise downloading the part of the possible content downloads, the part of the possible content downloads being associated with a specific download type.

19. The one or more computer storage media of claim 11, wherein the acts further comprise delaying downloading of the possible content downloads and requesting approval for downloading any of the possible content downloads.

20. The one or more computer storage media of claim 11, wherein categories of content downloads that are included in the first exemption list and the second exemption list comprise content downloads related to security updates, top rated content downloads at application stores, top selling content downloads at application stores and previously acquired content downloads.

21. A system comprising:
one or more processors; and
a plurality of instructions configured to cause the one or more processors, when executed, to:
   determine possible content downloads initiated by a computing device for background downloading;
   assess potential costs associated with possible content downloads based at least on first costs and a first exemption list for a first network and second costs and a second exemption list for a second network, the first exemption list and the second exemption list indicating content downloads that are exempted from costs charged by the first network and the second network, respectively;
   based upon the assessing, select one of the first network or the second network for background downloading at least a part of the possible content downloads;
   execute a background downloading based upon the selection;
   determine, during the background downloading, that the selected network becomes unavailable for performing the background downloading;
   in response to the determining that the selected network becomes unavailable, assess by the computing device costs associated with one or more available networks and costs associated with content still to be downloaded; and
   cease content downloading based on the costs associated with the one or more available networks exceeding a threshold.

22. The system of claim 21, wherein the plurality of instructions further comprise:
   receive from a network operator for the selected network information that the selected network is experiencing peak load; and
   pause downloading the one or more content downloads over the selected network until the network operator provides information that the selected network is no longer experiencing peak load.

* * * * *